(12) United States Patent
Hirotsune et al.

(10) Patent No.: US 6,532,034 B2
(45) Date of Patent: Mar. 11, 2003

(54) OPTICAL DISK, OPTICAL DISK APPARATUS, AND METHOD FOR WRITING FIGURES

(75) Inventors: Akemi Hirotsune, Saitama (JP); Yoshiko Nishi, Chofu (JP); Yumiko Anzai, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/942,614

(22) Filed: Aug. 31, 2001

(65) Prior Publication Data

US 2003/0001943 A1 Jan. 2, 2003

(30) Foreign Application Priority Data

Jun. 27, 2001 (JP) ......................................... 2001-195364

(51) Int. Cl.[7] ................................................ B41J 2/435
(52) U.S. Cl. ......................................................... 347/229
(58) Field of Search ................................. 347/224, 237, 347/247, 229; 369/13.24, 13.54, 14; 386/124, 126; 428/64.5

(56) References Cited

U.S. PATENT DOCUMENTS

| | | | | |
|---|---|---|---|---|
| 4,967,286 A | * | 10/1990 | Nomula et al. | 386/124 |
| 5,055,331 A | * | 10/1991 | Raichaudhuri | 428/64.5 |
| 5,751,671 A | * | 5/1998 | Koike et al. | 369/14 |

* cited by examiner

Primary Examiner—Hai Pham
(74) Attorney, Agent, or Firm—Antonelli, Terry, Stout & Kraus, LLP

(57) ABSTRACT

A method of writing a visible figure in an optical disk, including the steps of providing an application program; providing an optical disk having a recording region/film made of a phase-changing material in which a first visible figure is written, the application program storing data to write a second visible figure in the optical disk; reading data for writing the second visible figure; developing figure data which has been read into writing coordinates; converting the writing coordinates into disk coordinates; generating a laser driving pattern for each track of the recording region/film to write the second visible figure based on the developed figure data on the disk coordinates; and driving the laser based on the laser driving pattern, thereby irradiating the optical disk to write the second visible figure in the recording region/film to change the first visible figure into the second visible figure.

4 Claims, 20 Drawing Sheets

OPTICAL DISK, OPTICAL DISK APPARATUS, AND METHOD FOR WRITING FIGURES

BACKGROUND OF THE INVENTION

The present invention relates to a method of writing figures, such as letters and pictures that are visible to the naked eye, on an optical disk, and also to an optical disk apparatus having a function to visibly write figures, such as letters and pictures, on an optical disk.

There are several principles by which information is recorded on a thin film (recording film) by irradiation with a laser beam. Among them, the one which utilizes the change of atomic arrangement by irradiation with a laser beam, such as the phase change (also called phase transition) and photo-darkening of the film material, which is accompanied by very little deformation of the thin film, has the advantage that an optical disk of double-side disk structure, or a multi-layer optical disk having a plurality of information planes, can be obtained by directly bonding together two sheets of disk members. Such conventional optical disks as CD-R, CD-RW, PD, DVD-R, DVD-RW, and DVD-RAM disks reproduce recorded information by using an apparatus with a built-in laser.

The conventional optical disk needs a reproducing apparatus with a built-in laser source for reproduction of information recorded on an optical disk. Also, the content which the user has recorded on an optical disk could not be confirmed unless the optical disk is reproduced by the reproducing apparatus.

SUMMARY OF THE INVENTION

An object of the present invention is to provide an optical disk on which visible letters and marks can be made without requiring a reproducing apparatus. A further object of the present invention is to provide a method of recording visible letters, pictures and marks on an optical disk without requiring a reproducing apparatus.

An optical disk is a discoid-shaped recording medium in which information, which can be reproduced by using a difference in reflectivity, has been recorded or can be recorded. An optical disk comes in various types, such as one which has one layer of recording film, one which has two or more layers of recording film, one which has a ROM region and a RAM region, one which is capable of recording and reproducing many times, and one which is capable of recording once and which permits reproduction many times.

For the recording film of an optical disk, phase-changing materials, such as Ge—Sb—Te, In—Sb—Te, Ag—In—Sb—Te, germanide, antimonide, telluride, indide, etc., are usually used. An optical disk that uses a phase-changing material for the recording film records information by utilizing the fact that the phase-changing material of the recording film becomes crystalline or amorphous in response to irradiation with a laser beam which has been modulated by recording information and performs reproduction of information by utilizing the difference in reflectivity between the crystalline region and amorphous region.

It is also possible to use for the recording film an organic pigment capable of discoloration by light irradiation/heating in addition to the phase-changing material. The optical disk that uses an organic pigment for the recording film performs recording and reproducing by utilizing the fact that the hue changes because the discolored region and the colored region differ in reflectivity at visible wavelengths. The optical disk that uses an organic pigment is the same as the optical disk that uses a phase-changing material as far as the writing method and reproducing method are concerned, except that rewriting is impossible if the amorphous state is replaced by discoloration and the crystalline state is replaced by coloration in the phase-changing material. The present invention can be applied to optical disks of any type, so long as they are optical disks having a recording film or recording region capable of recording by a laser beam.

FIG. 1 is a diagram showing the difference in reflectivity in the case where a typical optical disk recording film material is made crystalline and amorphous, with the abscissa representing wavelength and the ordinate representing reflectivity. Ramo denotes reflectivity when the recording film material is made amorphous and Rcry denotes reflectivity when it is made crystalline. Recording of information in an ordinary optical disk is accomplished by forming amorphous recording marks by laser beam irradiation along the track of the crystalline recording film. And, reproduction of recording information is accomplished by reading off the position of recorded marks or the position of mark edges by utilizing the detected difference in reflectivity between the crystalline region and the amorphous region. The track width of the optical disk is about 0.1–0.8 $\mu$m, and the mark length is about 0.1–8 $\mu$m; and, since recording marks are extremely small, it is impossible to recognize individual recording marks with the naked eye.

The present inventors have turned their attention to the fact that the reflectivity of the crystalline region and amorphous region of the optical disk recording film material greatly varies in the visible region, and they have conceived that, if large letters and pictures crossing a plurality of tracks are depicted as figures in the recording film by connecting amorphous regions, it will be possible to recognize them with the naked eye by a difference in reflectivity between the amorphous region constituting the letters and pictures and the surrounding crystalline region. Thus, the present inventors have developed a method of writing such figures and a figure writing apparatus to carry out the method. Incidentally, the figure writing apparatus can be realized by incorporating a program for figure writing in an ordinary optical disk recording apparatus.

In this specification, "recording" means forming recording marks having "1" and "0" information by changing the atomic arrangement in the recording film of the optical disk by irradiation with light. "Writing" means writing visible letters and pictures in the optical disk by changing the atomic arrangement in the recording film of the optical disk by light irradiation or heating. "Erasing" means erasing information recorded in the optical disk or making invisible letters and pictures written in the optical disk.

By the present invention, the following optical disk, optical disk apparatus, or method for writing figures in the optical disk are provided.

(1) An optical disk having a first region and a second region divided in the radial direction is characterized in that data is recorded in said first region by recording marks, and a visible figure is written in said second region by gathering element regions in which the average reflectivity per area of 0.01 mm×0.01 mm differs more than 5% from the background region at any of the visible wavelengths.

The visible figure includes pictures, letters, symbols, etc. The background region denotes a region other than element regions of the second region, that is, the region which becomes the background of the visible figure formed by gathering element regions.

(2) An optical disk having a plurality of recording films is characterized in that data is recorded in said first recording film by recording marks, and a visible figure is written in said second recording film, which is different from said first recording film, by gathering element regions in which the average reflectivity per area of 0.01 mm×0.01 mm differs more than 5% from the background region at any of the visible wavelengths.

The visible figure includes pictures, letters, symbols, etc. The background region denotes a region other than element regions of the second region, that is, the region which becomes the background of the visible figure formed by gathering element regions.

(3) An optical disk has a region in which data for figure writing by recording marks has been recorded and a region in which a visible figure has been formed by gathering element regions in which the average reflectivity per area of 0.01 mm×0.01 mm differs more than 5% from the background region at any of the visible wavelengths, which is written based on said data for figure writing in said second recording film.

The visible figure includes pictures, letters, symbols, etc. The background region denotes a region other than element regions of the second region, that is, the region which becomes the background of the visible figure formed by gathering element regions. The region in which data for figure writing by recording marks is stored and the region in which a visible figure is formed may be on the same recording film or a different recording film.

(4) An optical disk, having a first region and a second region divided in the radial direction, is constructed such that data can be recorded in said first region by recording marks and a visible figure can be written in said second region by gathering element regions in which the average reflectivity per area of 0.01 mm×0.01 mm differs more than 5% from the background region at any of the visible wavelengths.

(5) An optical disk, having a plurality of recording films, is constructed such that data can be recorded in said first recording film by recording marks and a visible figure can be written in said second recording film different from said first recording film by gathering element regions in which the average reflectivity per area of 0.01 mm×0.01 mm differs more than 5% from the background region at any of the visible wavelengths.

(6) An optical disk has a region in which data for figure writing by recording marks is recorded and a region in which a visible figure is formed by gathering element regions in which the average reflectivity per area of 0.01 mm×0.01 mm differs more than 5% from the background region at any of the visible wavelengths, which is written based on said data for figure writing in said second recording film.

(7) An optical disk has a ROM region in which an application program and data of a figure to be visibly written in the disk by said application program are recorded, and a RAM region in which a visible figure is written based on the data of a figure recorded in said ROM region.

(8) A figure writing method comprises writing a visible figure in an optical disk by irradiation with light by causing element regions to gather in which the average reflectivity per area of 0.01 mm×0.01 mm differs more than 5% from the background region at any of visible wavelengths.

(9) A method of writing a visible figure in an optical disk comprises a step of reading figure data for figure writing from an optical disk, a step of developing the figure data which has been read into coordinates for writing, a step of converting the coordinates for writing into coordinates on the disk, a step of generating a laser driving pattern for each track based on the figure developed on the coordinates on the disk, and a step of driving the laser based on said laser driving pattern, thereby irradiating the optical disk with beam pulses.

(1) A method of writing a visible figure in an optical disk comprises a step of developing a figure into coordinates for writing based on the figure data which has been entered, a step of converting the coordinates for writing into coordinates on the disk, a step of generating a laser driving pattern for each track based on the figure developed on the coordinates on the disk, and a step of driving the laser based on said laser driving pattern, thereby irradiating the optical disk with beam pulses.

(11) A method of writing a figure as defined in section (10) above, wherein the figure is a letter and/or a symbol.

(12) A method comprises a step of loading an application program stored in an optical disk, a step of reading data for figure writing while said application program is proceeding, a step of developing the figure data which has been read into coordinates for writing, a step of converting the coordinates for writing into coordinates on the disk, a step of generating a laser driving pattern for each track based on the FIG. developed on the coordinates on the disk, and a step of driving the laser based on said laser driving pattern, thereby irradiating the optical disk with beam pulses to visibly write said figure on said optical disk.

(13) A method as defined in section (12) above, wherein the step of visibly writing said figure is accomplished by gathering element regions in which the average reflectivity per area of 0.01 mm×0.01 mm differs more than 5% from the background region at any of the visible wavelengths.

(14) An optical apparatus comprises an optical disk driving unit to turn and drive an optical disk, an optical head which has a light source and a light detector and is movable relative to the optical disk, a means to manage separately a region for data recording by use of a recording mark and a region for writing a visible figure in the physical user region of the optical disk, an input means to enter data for figure writing, a means to generate a waveform for said light source driving from the data for figure writing which has been entered from said input means, and a function to write a visible figure in a region corresponding to the region for writing said visible figure by gathering element regions in which the average reflectivity per area of 0.01 mm×0.01 mm differs more than 5% from the background region at any of the visible wavelengths.

(15) An optical disk apparatus as defined in section (14) above, wherein the figure is a letter and/or a symbol.

Other and further objects, features and advantages of the invention will appear more fully from the following description.

BRIEF DESCRIPTION OF THE DRAWINGS

A preferred form of the present invention is illustrated in the accompanying drawing, in which.

DETAILED DESCRIPTION OF THE PREFERRED EMBODIMENTS

In the following description, the mode of carrying out the invention will be explained with reference to the drawings.

Figure 1:
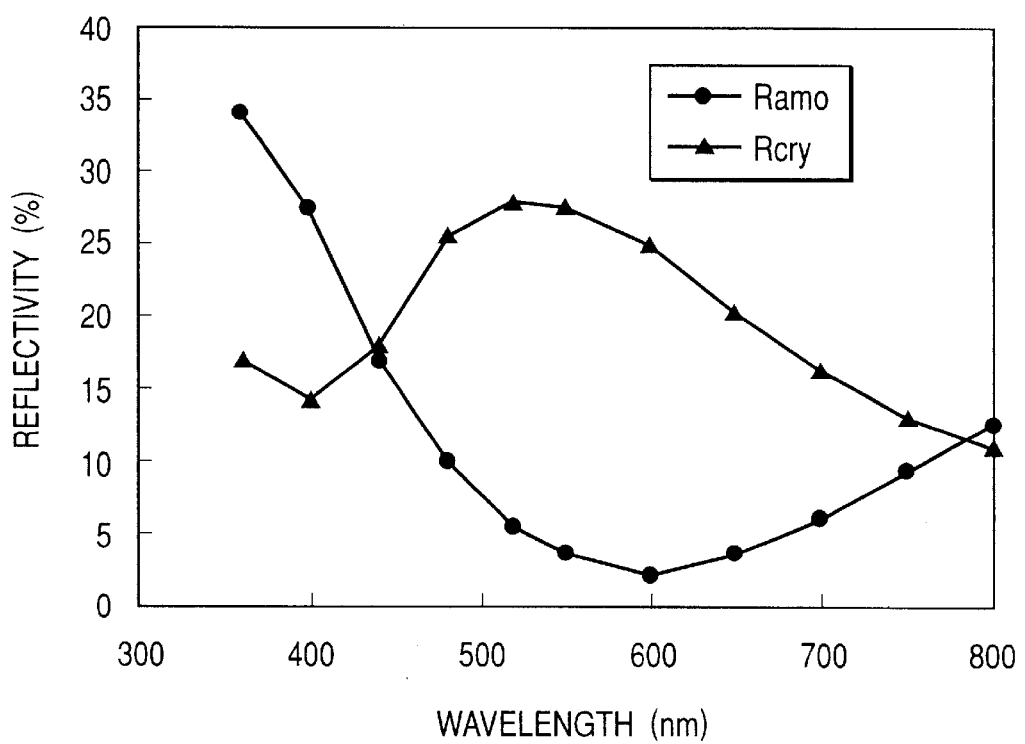
FIG. 1 is a graph showing the reflectivity characteristics of the optical disk.
Figure 2:
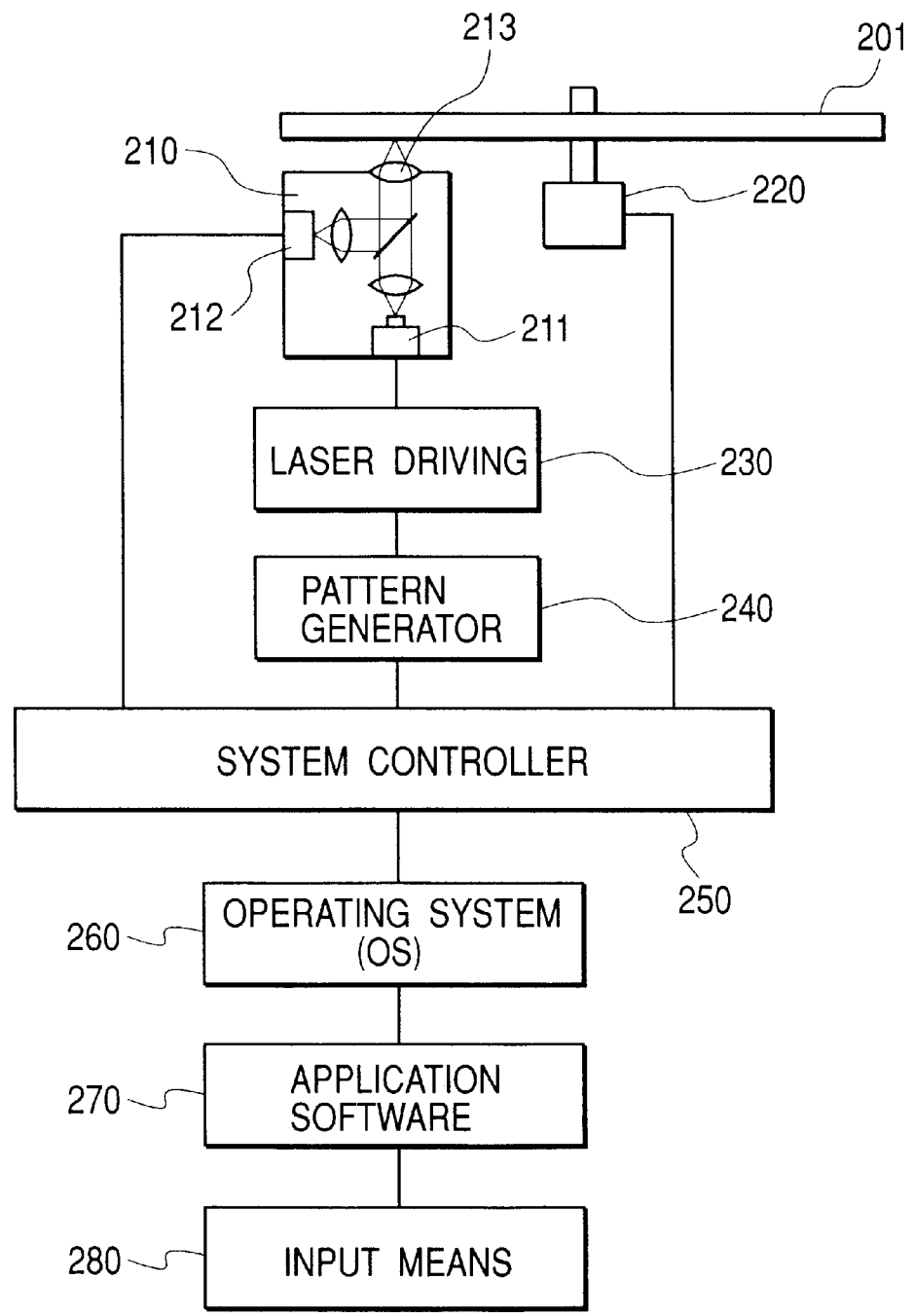
FIG. 2 is a schematic block diagram showing one example of the optical disk having the figure writing function according to the present invention.

FIG. 2 is a schematic block diagram showing one example of an optical disk apparatus which is capable of writing figures on an optical disk according to the present invention. Incidentally, for the convenience of explanation, how the optical disk 201 is inserted into and mounted on the apparatus is not shown. Although the optical disk 201 is essential to write information, the optical disk 201 is dismounted from and mounted on the optical disk apparatus according to need. The optical disk apparatus is constructed of an optical head 210, which is capable of moving in the radial direction of the optical disk 201, and is provided with a semiconductor laser 211, a photodetector 212 and an object lens 213; a motor 220, which turns and drives the optical disk 201; a laser driver 230, which drives the semiconductor laser 211 according to the pattern generated by a pattern generating circuit 240; a system controller 250, which controls the entire apparatus; an operating system 260; application software 270; and an input means 280, which enters data recording information and figure writing information. Incidentally, although not shown, the optical head 210 is provided with an actuator to control the position in the optical axis direction of the object lens 213 and the position in the direction vertical to the optical axis for autofocusing and tracking, and this optical head 210 is provided with a servocontroller which generates actuator driving signals based on signals detected by the optical head 210.

When the optical disk is mounted on the optical disk apparatus having a figure writing function and instructions of figure writing and information of FIGS. to be written are delivered from the upper level controllers, such as the application software 270 and operating system 260 through the input means 280, the system controller 250 positions the focal point of the laser beam generated from the optical head 210 at an appropriate position of a selected information layer on the optical disk 201 and drives the laser driver 230 and writes figures according to the writing pattern.

Figure 3:
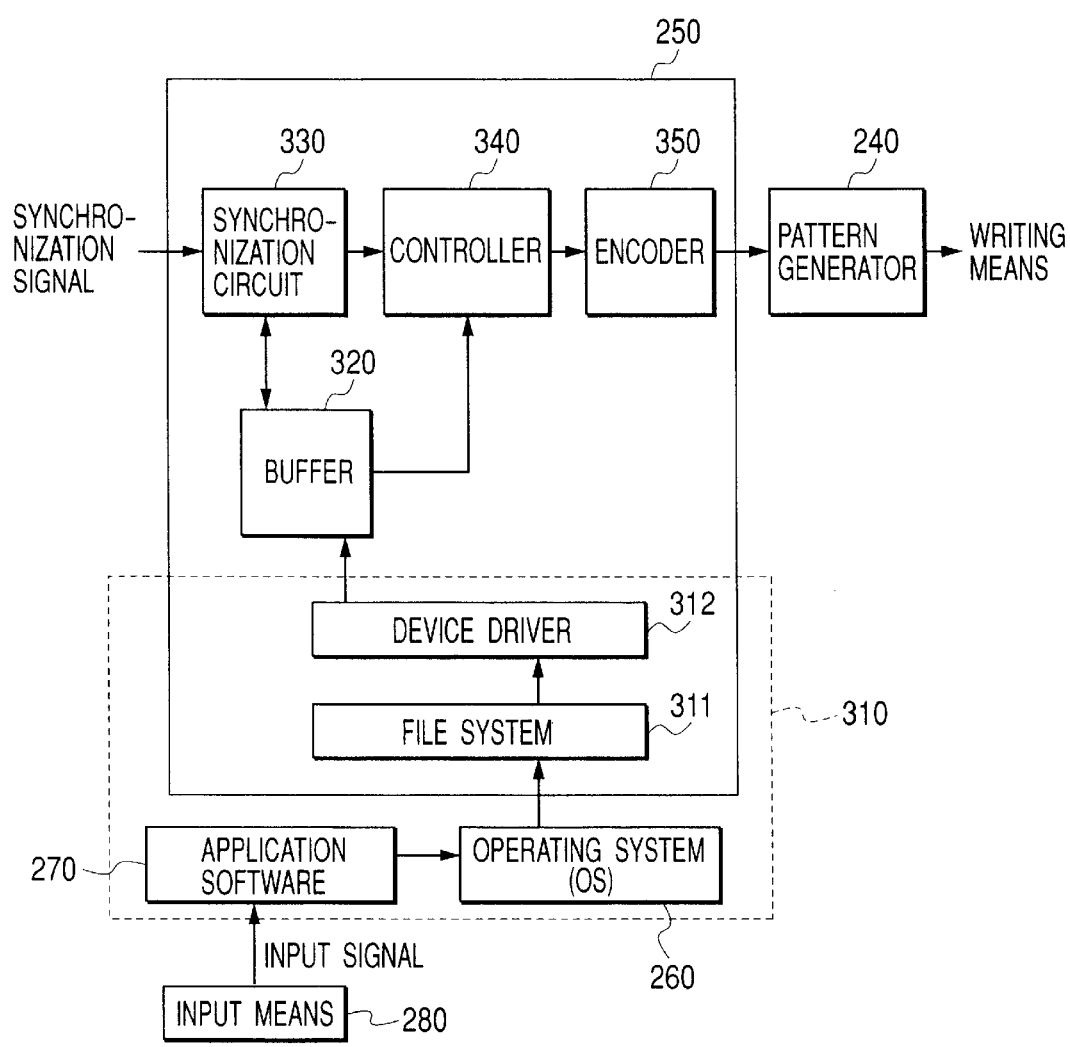
FIG. 3 is a block diagram illustrating one example of the system controller.

FIG. 3 is a block diagram illustrating one example of the system controller. Input signals from the input means 280 are delivered to the file system 311 of the system controller 250 through the application software 270 and operating system 260, and this data is accumulated in the buffer 320 through the device driver 312. The function of the application software 270, operating system 260, file system 311, and device driver 312, which are surrounded by broken lines in FIG. 3, is realized by the software 310. This software 310 differs from the software of an ordinary optical disk apparatus which only performs data recording and reproduction in that "a function to control the data recording area and the figure writing area" is added. "The function to control the data recording area and the figure writing area" is assigned to the file system 311 or the device driver 312.

Figure 4:
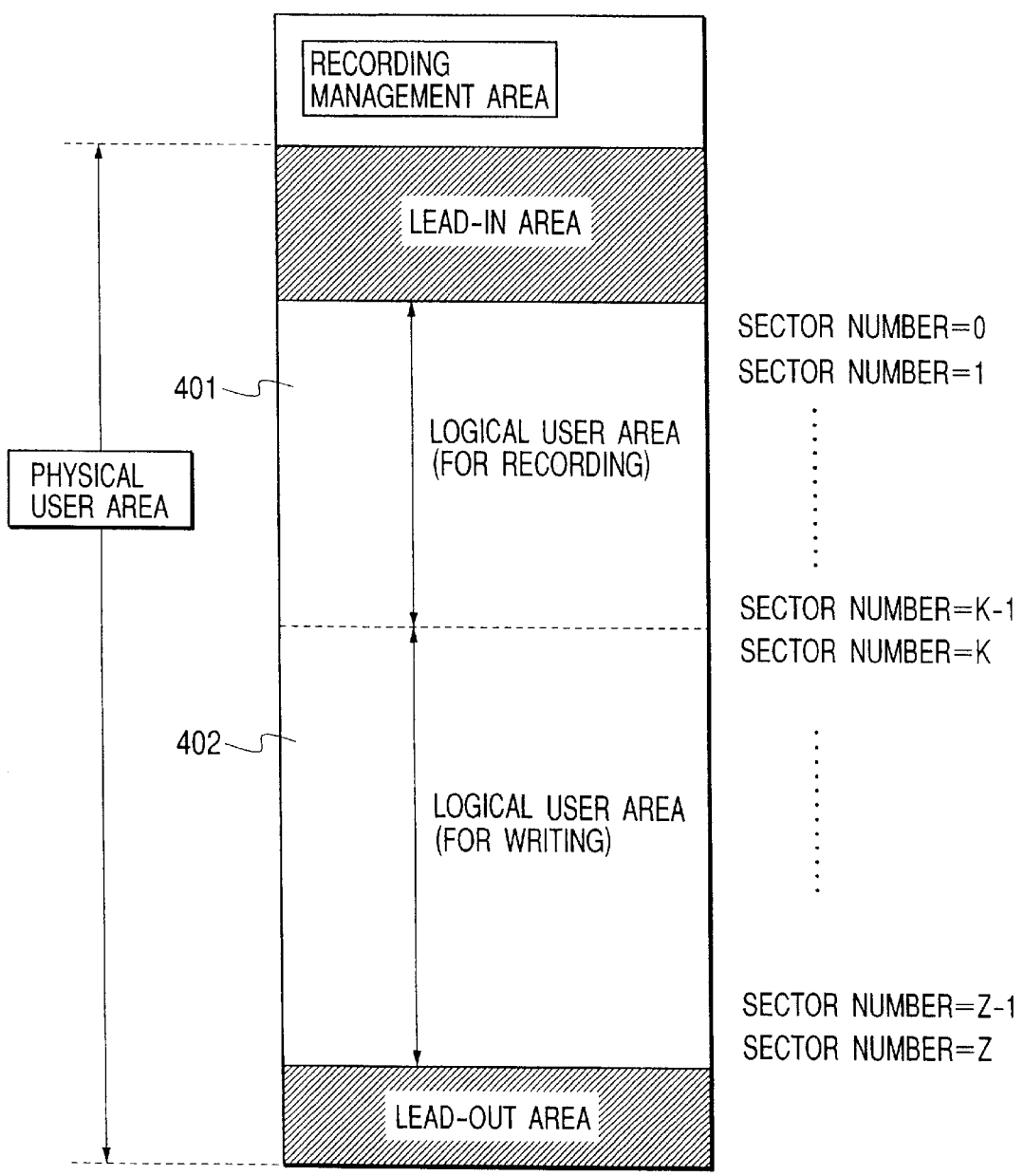
FIG. 4 is a conceptual diagram showing one example of the sector arrangement of the optical disk.

FIG. 4 is a diagram showing one example of the sector arrangement of the optical disk. In the case where a figure is written together with a record of data in a sheet of the optical disk, the logical user region in which the user can record data or write a figure is divided into the logical user region 401 for data recording and the logical user region 402 for figure writing so as to effect control. In the example of FIG. 4, the sector number of the logical user region 401 for data recording is allocated to the smaller ones (from 0 to k−1), and the logical user region 402 for figure writing is allocated to the larger ones (from k to z), thereby establishing them separately in the optical disk. If the data recording area is allocated to that region having the larger sector number, errors are liable to occur during reproduction in the data recording area; therefore, it is established in this way. The ratio of k and z is determined by the application, and in the case of a disk for figure writing only, which has no data recording area, k=0. In the case where half an area of the region capable of recording on the optical disk is used as a figure writing area, k is an integer value of approximately half of z. Incidentally, in consideration of establishing a compatibility with the existing system in which the handling of recording data is 16 sectors each, making k a multiple of 16 is desirable because the waste of capacity is reduced.

In the case where the division of the data recording area and the figure writing area is accomplished by the file system 311 of the system controller 250, the arrangement information of the logical user region 401 for data recording and the logical user region 402 for figure writing is recorded in the logical user region for recording in the user region in the optical disk and is referenced at the time of recording/reproducing. In the case where the division of the data recording area and the figure writing area is accomplished by the device driver 312, the information concerning arrangement of the logical user region 401 for data recording and the logical user region 402 for figure writing is controlled for each application by the device driver 312 and is referenced at the time of recording/reproducing.

Figure 5:
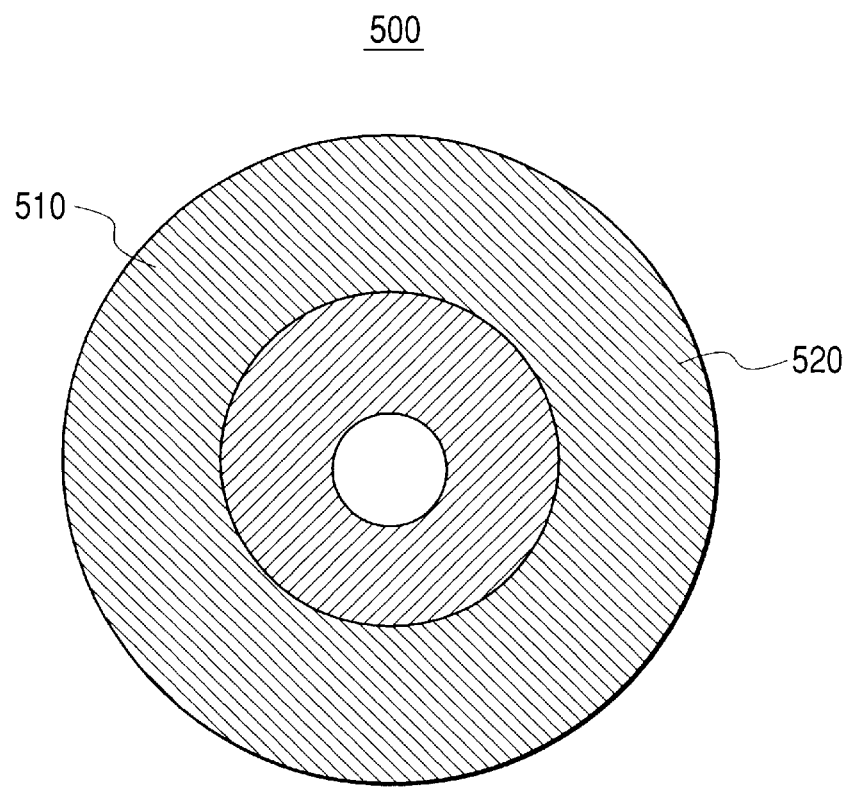
FIG. 5 is a diagram showing an example in which the recording film of one layer is divided into a data recording area and a figure writing area.

In the case where a single layer of recording film is divided into a data recording area and a figure writing area, it is desirable that the data recording area is allocated to that area closer to the lead-in area than the figure writing area and the figure writing area is allocated to that area that is far from the lead-in area. As shown in FIG. 5, in the optical disk 500, such as a DVD-RAM, DVD-RW, DVD-R, CD-R, and CD-RW which has a lead-in area inside, the data recording area 510 for recording digital data is formed inside, and the figure writing area 520 in which letters and figures (such as pictures) visible with the naked eye are written is formed outside. The ratio of the size of the data recording area 510 and the figure writing area 520 can be determined for each object; however, in order to recognize with the naked eye the letters and pictures written in the figure writing area 520, it is necessary that the width in the disk radial direction of the figure writing area 520 should be 0.01 mm or more.

Figure 6:
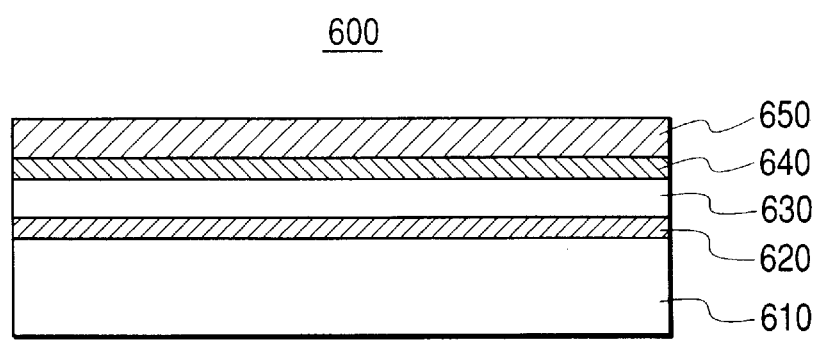
FIG. 6 is a diagram showing an example in which the data recording area and the figure writing area are allocated to an optical disk having a multilayer recording film.

In the case of an optical disk, such as a double-layer disk, which has a recording film in multiple layers, it is permissible to allocate the data recording area and the figure writing area to different recording films. FIG. 6 is a sectional schematic diagram showing one example of a double-layer disk having two layers of recording film. The optical disk 600 of this example has a structure in which a first recording film 620 and a second recording film 640 are laminated on a substrate 610 having a spacer layer 630 interposed between them and a protective layer 650 is formed on the uppermost layer. In the case of such an optical disk 600 having multiple recording films, if the figure writing area is formed at the light incident side, the reflectivity change is large and the recording power variation becomes large; therefore, it is desirable to allocate the recording film 620 near the light incident side relative to the data recording area to record digital data, and to allocate the recording film 640 far from the light incident side relative to the figure writing area to write letters and pictures visible with the naked eye.

FIGS. 7(*a*) to 7(*c*) are diagrams showing one example in which pictures and letters as visible figures are written in one layer of recording film of a multilayer disk according to the present invention. The optical disk 700 of this example has a recording film of phase-change type recordable by the user, and visible FIGS. 710 and letters 720 are written in the recording film. In writing pictures and letters, like the case of recording ordinary digital data, the optical disk is irradiated with a laser beam according to figure data of pictures and letters to bring about a phase change in a prescribed region of the recording film. If a material capable of irreversible phase change is used for the recording medium, the above-mentioned figures, such as pictures and letters, can be rewritten, and visible figures can be rewritten as from FIG. 7(*a*) to FIG. 7(*b*), FIG. 7(*c*), according to the change of situation.

Figure 8A:
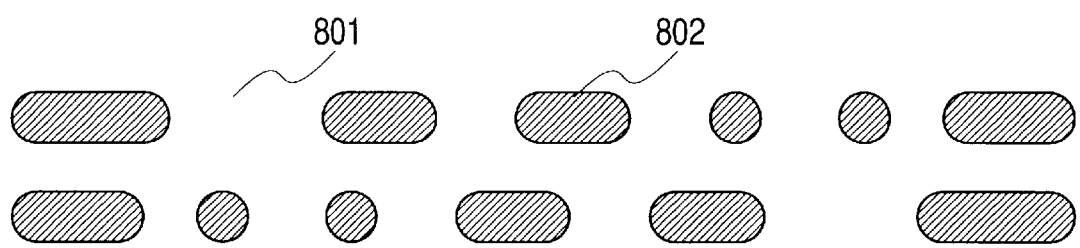
FIGS. 8(a) and 8(b) are diagrams showing the ratio of the crystalline region (space portion) and the amorphous region (mark portion)
Figure 8B:
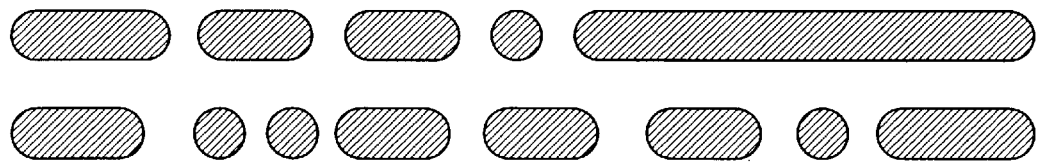

Here, in the case of ordinary data recording, in the user region as shown in FIG. 8(*a*), a modulating method is adopted in which the ratio of the crystalline region (space portion) 801 and the amorphous region (mark portion) 802 is distributed approximately evenly (5:5) in the circumferential direction in the recording region of the recording film, but in writing visible pictures and letters, the mark by an amorphous region is formed in a large gathering of amorphous regions across a plurality of tracks in the crystalline region on the recording film; therefore, the ratio of the crystalline region (non-writing portion) and the amorphous region (writing portion) is not limited to approximately even. To make it more readily visible, in the large gathering of amorphous regions in the writing region, as shown in FIG. 8(*b*), if the ratio of crystalline region (non-writing portion)/amorphous region (writing portion) in the circumferential direction in the recording region of the recording film is made ⅝or above, the contrast becomes large, and therefore this is desirable. Like this, the amorphous region and the crystalline region of the recording film differ in reflectivity distribution in the visible wavelength range, and marks by the amorphous region gather to form a large region. Therefore, hue/lightness/saturation varies and it becomes possible to recognize with the naked eye written pictures and letters.

FIGS. 9(*a*) and 9(*b*) are diagrams showing an example in which visible letters have been written according to the present invention in the optical disk shown in FIG. 5. This disk 900 is capable of recording and reproduction of ordinary digital data using the data recording area set in the zone inside the inner circumference and of writing the visible letter 921 in the figure writing area 920 set in the zone outside the inner circumference. The visible letters are rewritable, and it is possible to write additional letters 922 like FIG. 9(*a*) and FIG. 9(*b*) according to a change in situation. Writing of pictures and signs as well as letters is also possible in the same way.

The synchronizing method in the circumferential direction of the disk regarding positioning, synchronizing and access at the time of figure writing is as described below. In the disk, information is recorded which indicates the kind of disk, and the sector arrangement on the disk is judged based on this. Positioning, synchronizing and access at the time of figure writing are accomplished according to tracking signals, ID reproducing signals of a pit, and wobble signals due to irregularities and deformation formed in the substrate of the optical disk. If synchronizing and/or position detecting is performed by address information, such as tracking signals, ID reproducing signals of a pit, and wobble signals due to irregularities and deformation in the substrate of the optical disk, the accuracy of the writing position will rise, and more distinct letters and/or pictures, signs are written, which is preferable.

Figure 10:
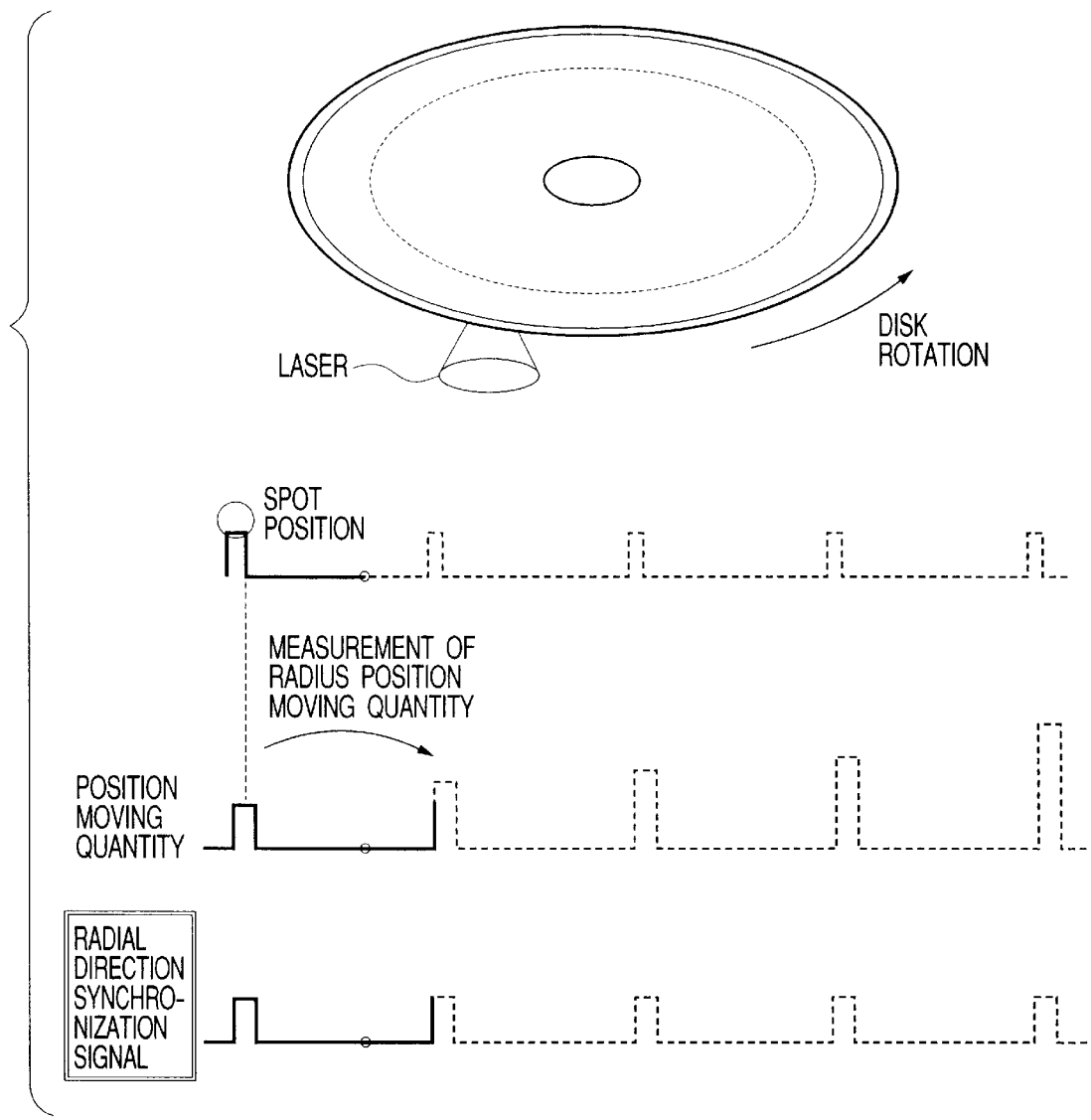
FIG. 10 is a diagram illustrating the positioning, synchronizing, and access method at the time of figure writing.

In addition, as shown FIG. 10, it is permissible to perform positioning, synchronizing and access from a moving distance from the reference point of the innermost circumference. The reference point may be another position instead of the innermost circumference. In this case, in the case of a certain amount of movement, by issuing synchronizing signals in the radial direction, the amount of movement from the radial position can use the driving signals/moving time signals etc. for a certain period of time as synchronizing signals in the radial direction.

Figure 11:
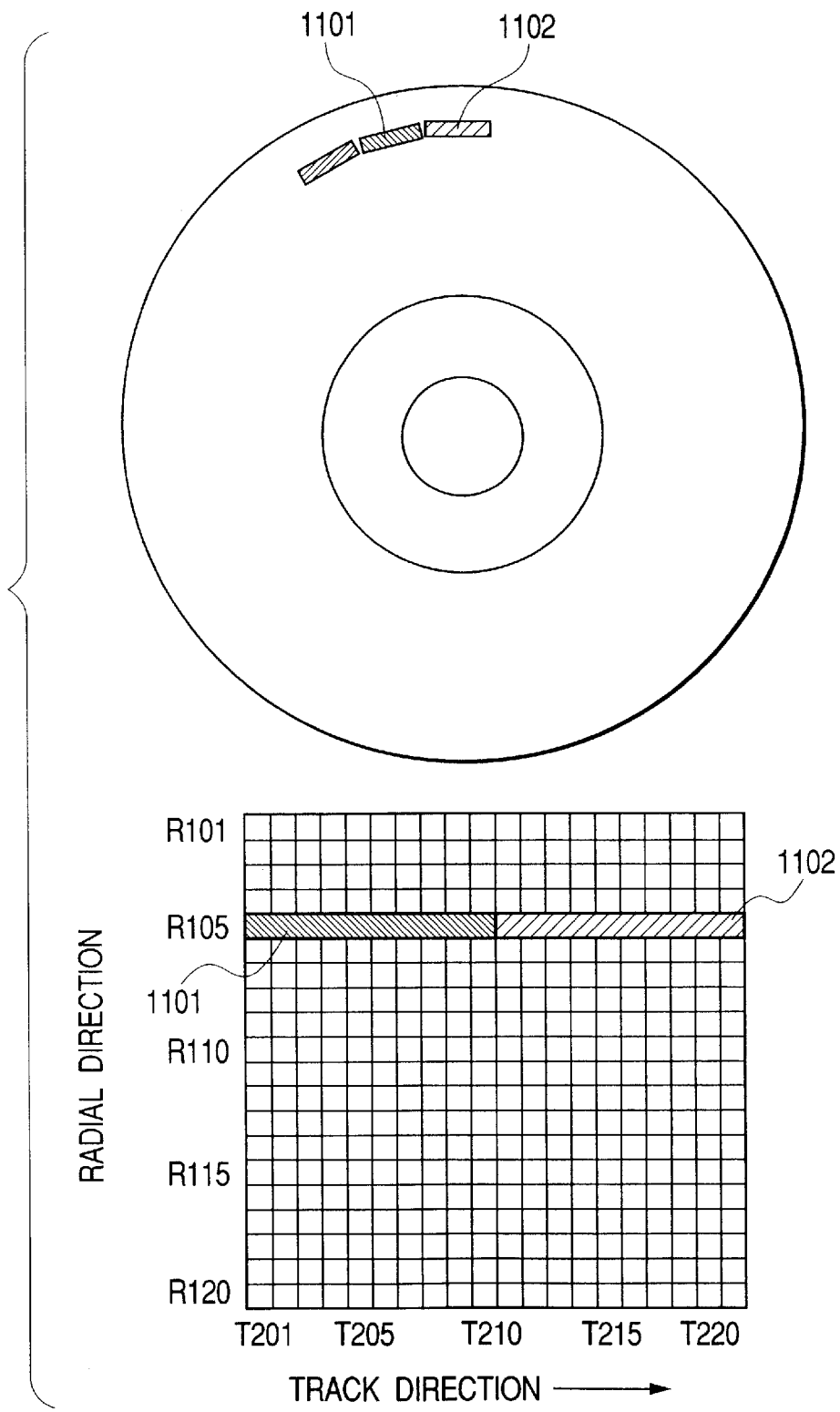
FIG. 11 is a diagram showing one example of the relation of the arrangement of sectors and the coordinates for figure writing.

The optical disk of the present invention, having the figure writing function, has a corresponding table for information as to the arrangement of sectors and coordinates for figure writing for each kind of disk, such as a CD-R, CD-RW, PD, DVD-R, DVD-RW, and DVD-RAM disk. FIG. 11 is a diagram showing one example of the relation of the sector arrangement and the coordinates for figure writing. According to this example, sector 1101 corresponds to the coordinates (R105, T201)~(R105, T210) and the sector 1102 corresponds to the coordinates (R105, T211)~(R105, T220).

The figure based on the data for figure writing is caused to correspond to the sector on the optical disk upon development into the coordinates for figure writing, and the pattern for laser driving is generated based on it.

Figure 9A:
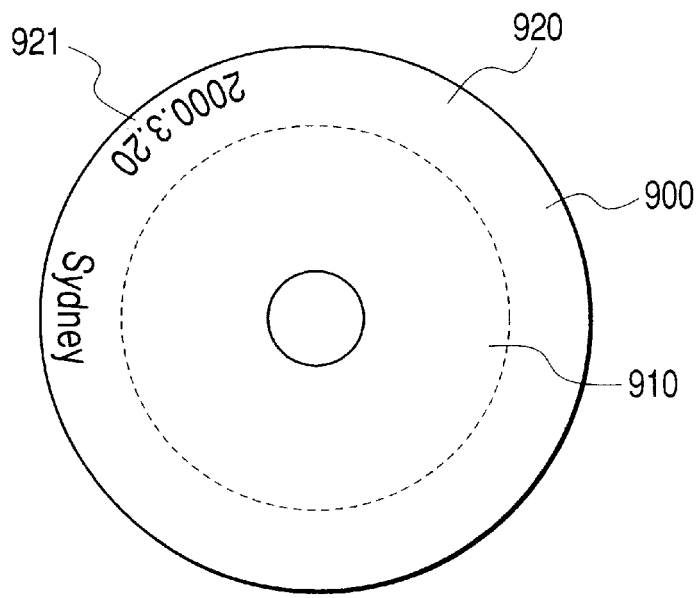
FIGS. 9(a) and 9(b) are diagrams showing an example in which visible letters are written in the optical disk shown in FIG. 5 according to the present invention.
Figure 9B:
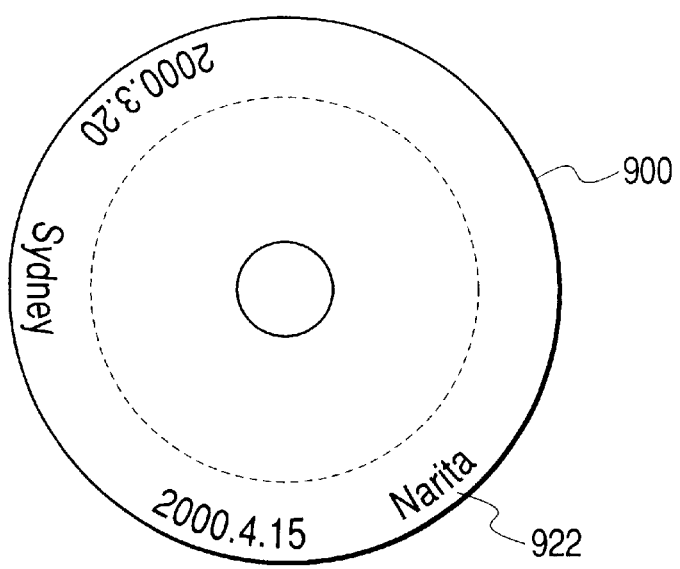

Next, an example of the processing in the case of writing letters, figures, or pictures on the recording surface of the optical disk will be explained. Here, an example will be considered in which data, such as image data and letters input from the keyboard as an index for it, are written in the visible form. The index data is data which may be input by the user or data attached to the recording data, such as pictures or data determined by the system. Taking image data such as photographs as an example, it is possible to write the title and date and time of an image as an index. For example, as FIG. 9(a) shows, the title together with the image data is written as visible letters; and, subsequently, other image data are recorded, and it is possible to additionally write the title, as shown in FIG. 9(b). In addition, a method such as writing the owner or the user ID or the capacity of the optical disk as the index is also possible.

Figure 12:
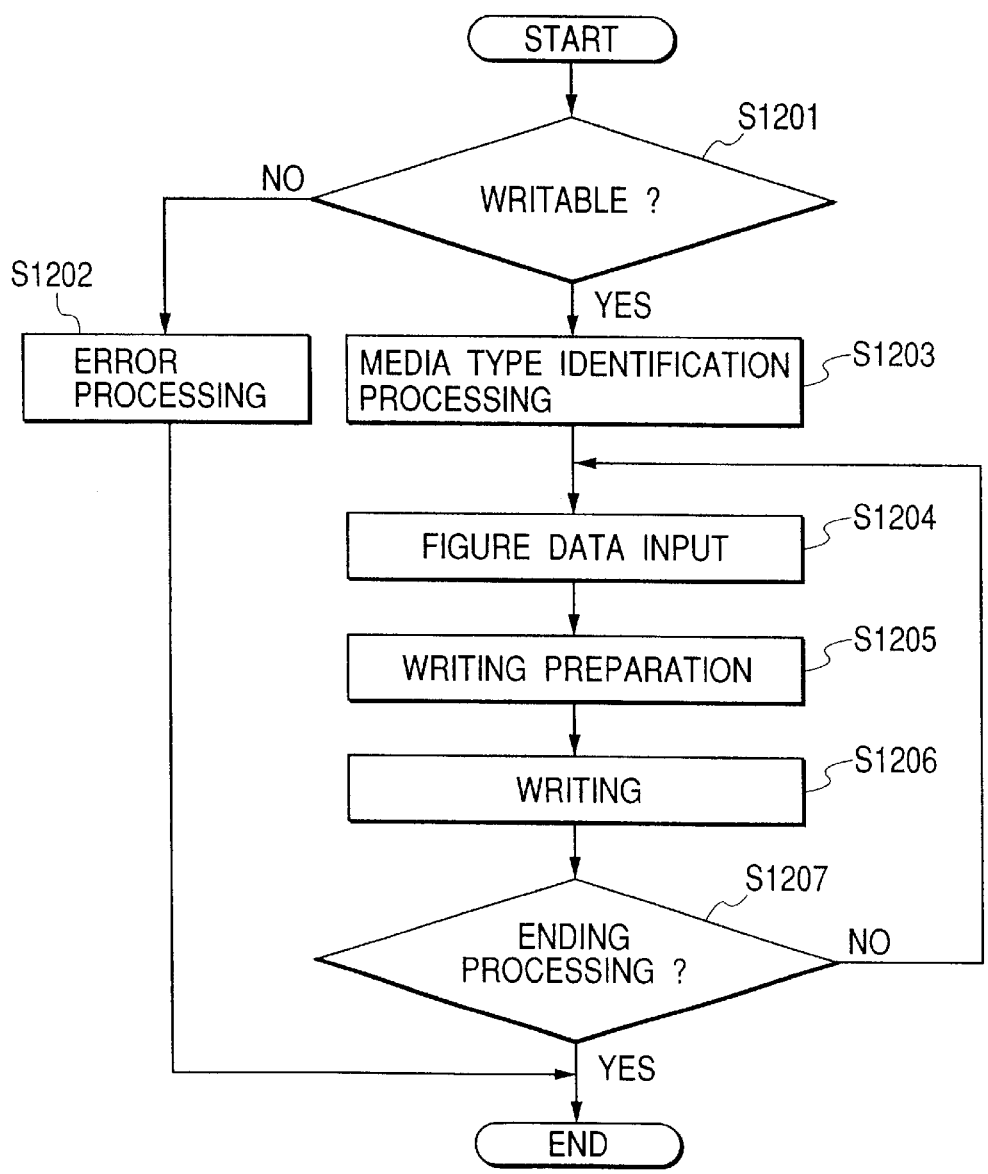
FIG. 12 is a flow chart showing an example of the processing for the case where visible figures are written in the optical disk.

FIG. 12 is a flow chart showing an example of a process for the case where visible figures are written in the optical disk. As the disk is inserted into the apparatus and the power source is enabled, the discrimination process of determining whether or not a figure writable disk is present (step 1201) will be carried out first. In the case where a ROM disk or a disk of another standard than that of the apparatus has been inserted, an error process is performed since the disk is not writable (step 1202). If the disk is figure writable, then the discrimination process to determine the kind of disk is performed next (step 1203). In the discrimination step to determine the kind of disk, correspondence between the coordinates for figure writing and the sector arrangement of the optical disk is examined, as was explained with reference to FIG. 11. Then, figure writing data is entered (step 1204). As data is entered, the writing of figure data is performed through the writing preparation (step 1205). After the figure writing process has been completed, the process is repeated by returning from step 1207 to step 1204 if there are additional data, and the process terminates if there is no more input data.

The figure writing preparation and figure writing process are performed under the control of the system controller 250. The figure writing preparation is a process of moving the optical head to the figure writing position on the optical disk, encoding the writing content and the writing color tone, and transmitting data to the writing means. As shown in FIG. 3, when an input signal containing address information showing the writing content and the place to start writing to the optical disk is sent to the system controller 250, the information is stored in the buffer 320 and is sent to the controller 340. In the controller 340, the synchronizing signal output from the synchronizing circuit 330 and the input signal from the buffer 320 are sent to the encoder 350 in the proper timing.

Figure 13:
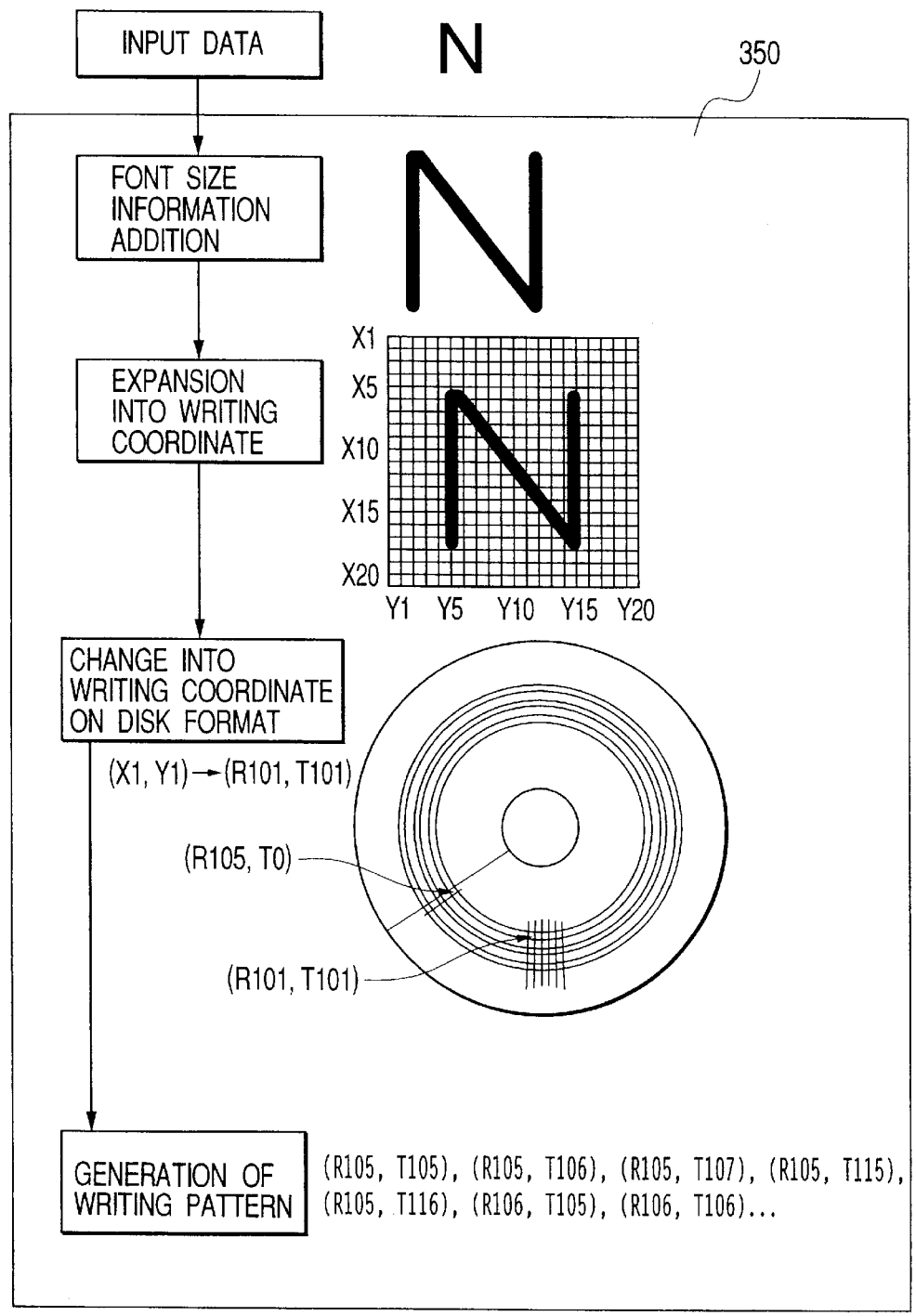
FIG. 13 is a diagram showing the details of processing in the encoder.

FIG. 13 is a diagram showing details of the processing carried out in the encoder 350. The figure writing data (character "N" in the example shown) entered from the keyboard, after addition of font size information, is developed into the coordinates for figure writing, and conversion into the actual figure writing coordinates set on the disk is performed. For example, "N" is developed into X-coordinate 1~20, Y-coordinate 1~20. Writing is performed in the area corresponding to (X5, Y5), (X5, Y6), (X5, Y7) of these. Based on this writing information and the corresponding table of the sector and the figure writing coordinate as shown in FIG. 11, the figure writing pattern is formed. In the case of the shown example, (X5, Y5), (X5, Y6), (X5, Y7) are converted into (R105, T105), (R105, T106), (R105, T107), respectively, so as to make the write starting point (R101, T101) of the figure writing coordinate on the disk correspond to (X1, Y1) of the coordinates for figure writing.

Figure 14:
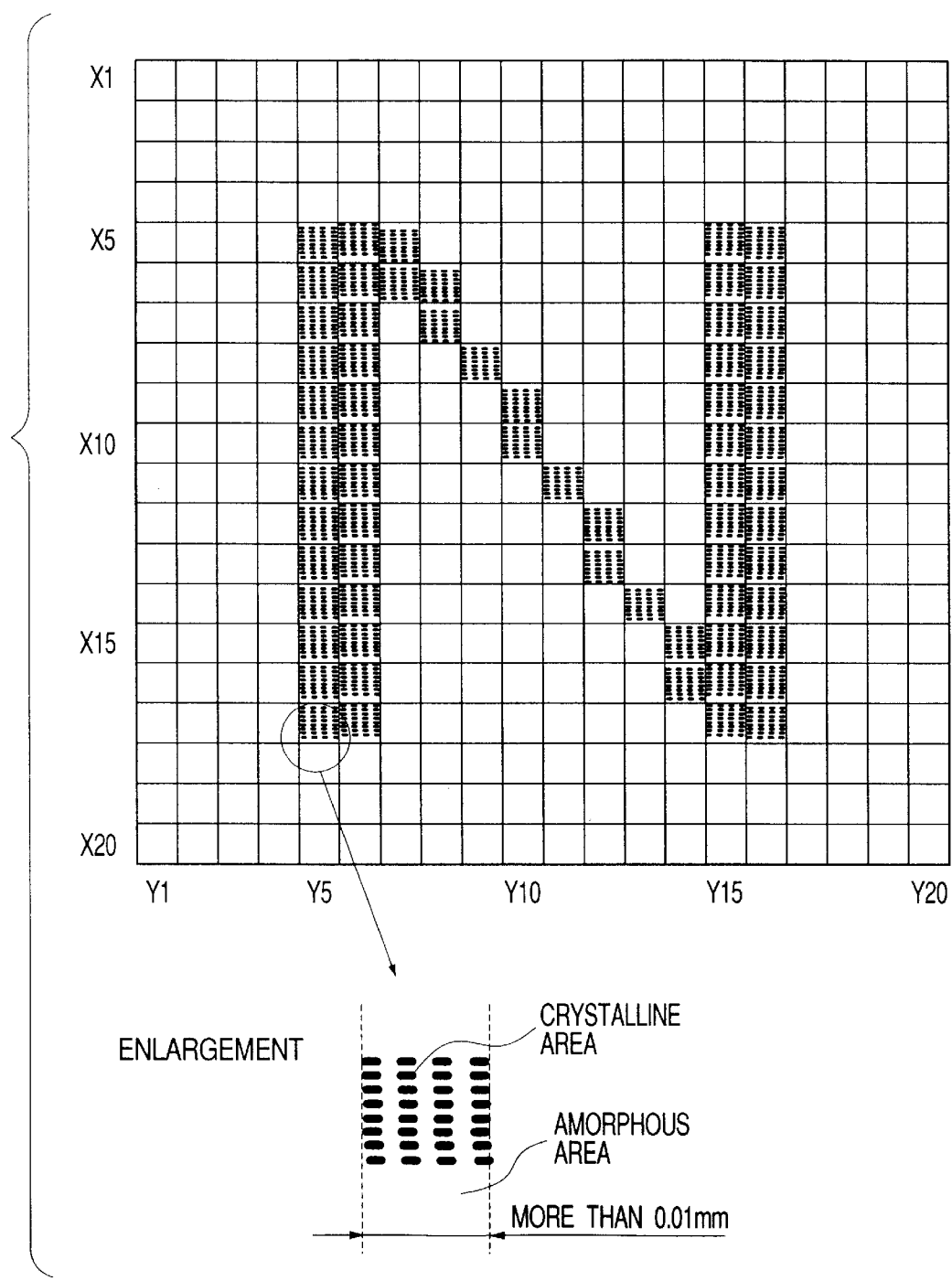
FIG. 14 is an enlarged diagram showing the coordinates for figure writing and the letter "N" developed on it.

FIG. 14 is an enlarged diagram of the coordinates for figure writing and the letter "N" which has been developed thereon. The region (X17, Y5), which becomes (R117, T105) after conversion, is formed from a plurality of amorphous regions, as shown in enlarged view in FIG. 14. In this example, for simplification, it is formed with 8 tracks, but to be actually visible, the area shown with one coordinate point of the coordinates for figure writing needs an area larger than 0.01 mm×0.01 mm. For example, in the case of an optical disk having a track width that is about 0.6 μm wide, it is necessary to correspond to about 17 tracks or more and a length of more than 0.01 mm. The shape of the region of 0.01 mm×0.01 mm or more may be a square, rectangle, trapezoid, hexagon, triangle, or a shape close to them. Also, for the written figure to be visible, it is necessary to cause a reflectivity change of more than 5% compared with the surrounding area at any of the visible wavelengths to occur in the region having a width of more than about 0.01 mm×0.01 mm. The reflectivity change is referred to as the average reflectivity change in the region. Either in the case where the area in which the reflectivity change that has occurred is small, or in the case where the reflectivity change itself is small, it is difficult to recognize the written figure.

Figure 15:
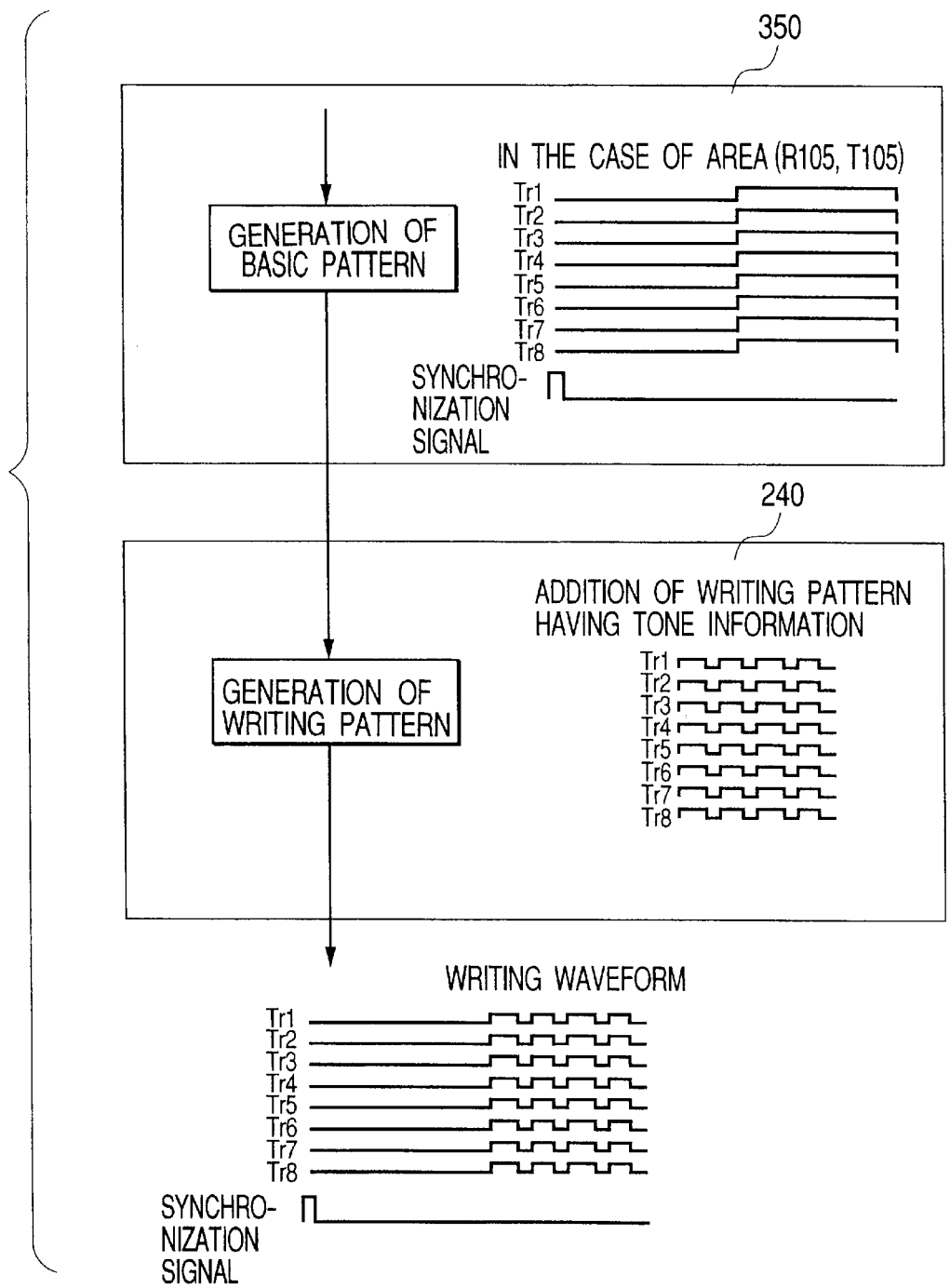
FIG. 15 is a diagram illustrating the formation of a writing waveform.

FIG. 15 is a diagram illustrating the formation of a writing waveform. In the encoder 350 of the system controller 250, based on the corresponding table of the sector and the figure writing coordinates, on the basis of the figure developed in the figure writing coordinates, the fundamental writing pattern is formed, taking a timing in response to the synchronizing signal for each track following the recording order. In FIG. 15, a writing pattern corresponding to the figure writing coordinates (R105, T105) on the disk is illustratively shown. In the pattern generating circuit 240, a writing pattern is added to this in response to the color tone and a final writing waveform is generated and stored in the buffer. Regarding the color tone, we will mention that later.

With reference to FIG. 2, by driving the laser driver 230 in response to a writing waveform output from the pattern generating circuit 240, the semiconductor laser 211 emits light, the laser beam modulated in terms of time in response to information to be written from the optical head 210 is irradiated to the optical disk 201, and a figure consisting of letters and pictures is written on the optical disk 201. The driving current of the semiconductor laser 211 is changed in synchronism with the synchronizing signal in the circumferential direction of the optical head 210 or the writing clock fundamental wave.

Figure 16A:
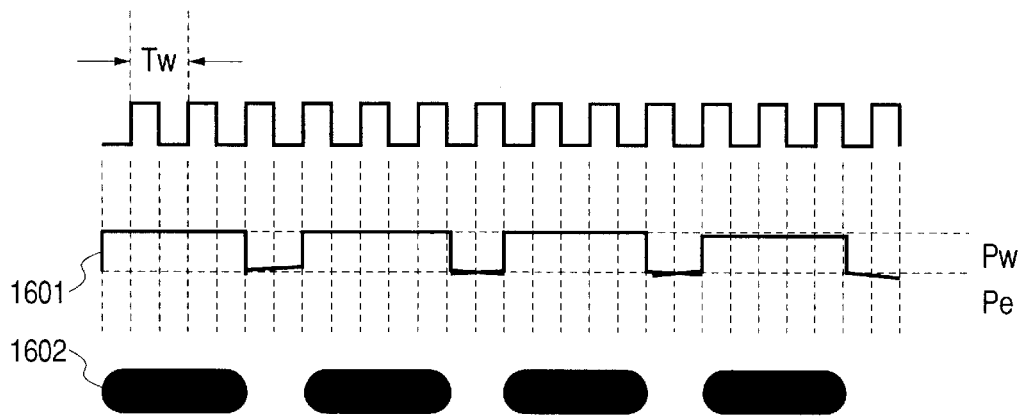
FIGS. 16(a) and 16(b) are diagrams illustrating a method of setting a color tone level.
Figure 16B:
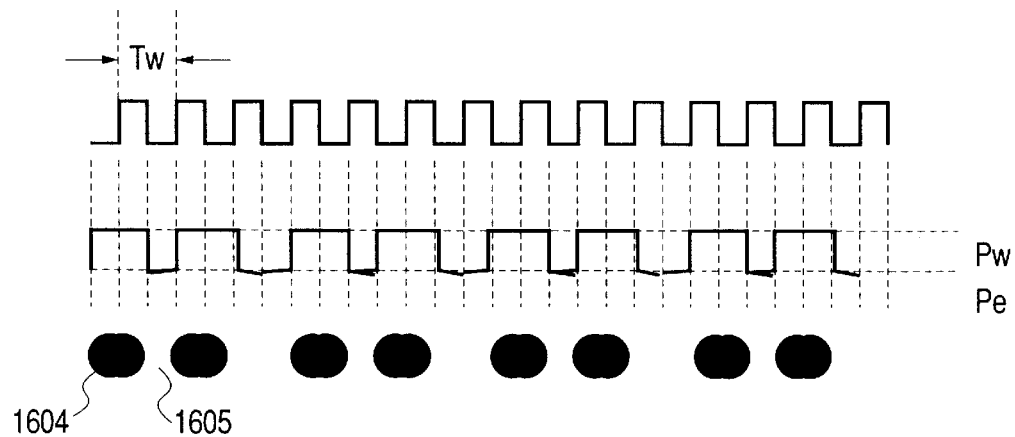

Here, features regarding the color tone will be explained. FIG. 16(a) is a diagram which shows the power level (writing waveform) and the writing content at the time of modulating the laser light for one track portion in one coordinate point of FIG. 14 for making the recording film of the optical disk amorphous. The black dot portion shown under the recording waveform represents the region in which the recording film of phase-change type has been made amorphous by laser beam irradiation. In the drawing, Tw represents the window width, Pw represents the writing power, and Pe represents the erasing power. In this way, as the recording film is made amorphous by irradiating the recording film of the optical disk with a high power, a plurality of amorphous regions are formed, as shown in FIG. 14. When this is viewed, it looks as though one letter "IN" is formed.

Also, when a high power is partially omitted at the modulation time of the laser beam, the ratio which the amorphous region occupies decreases and the ratio which the crystalline region occupies increases. In this way, if the area ratio of the amorphous region per one coordinate region is made small and the average reflectivity difference is made smaller, the contrast at the viewing time decreases, and it is possible to change the level of color tone compared with the case of FIG. 16(a). If the average reflectivity difference is changed stepwise like this, it is possible to change the level of the color tone stepwise.

Figure 17A:
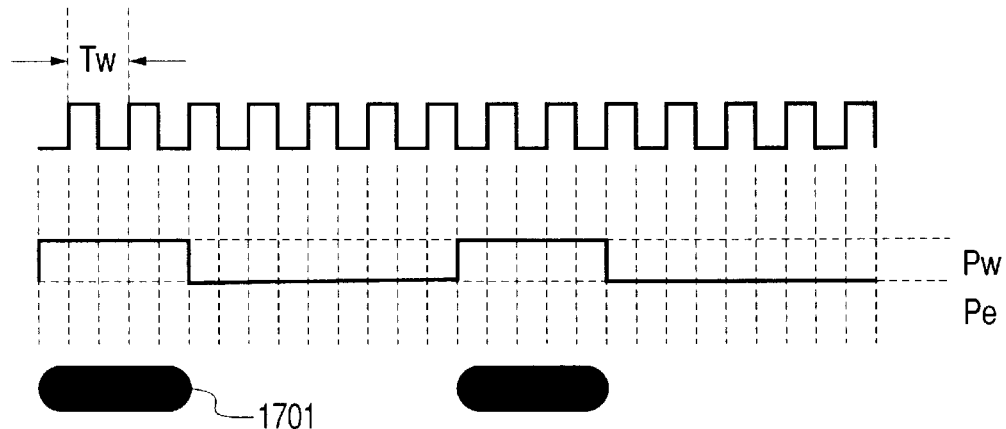
FIGS. 17(a) and 17(b) are diagrams showing another example of a method of changing the color tone level.
Figure 17B:
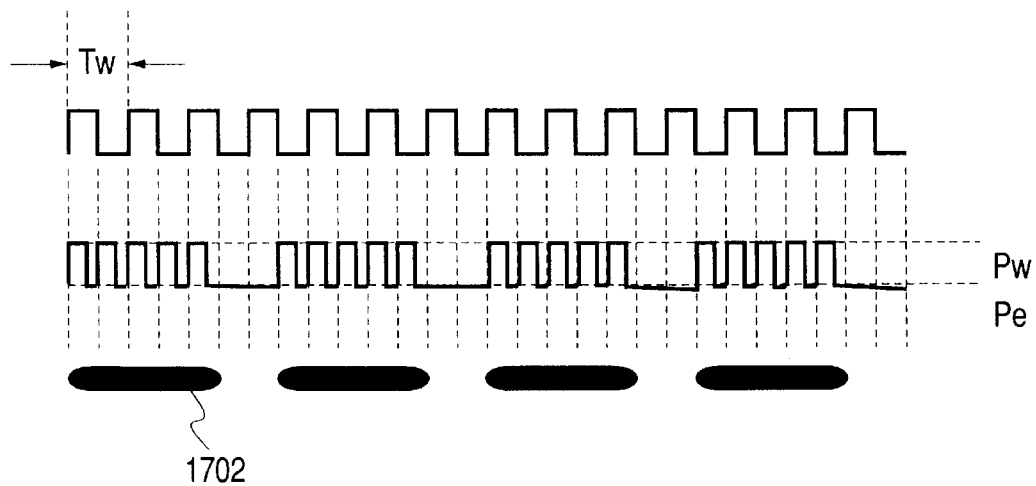

In addition, the method of changing the color, tone level may be attained by decreasing the number and length of the amorphous region 1701, as shown in FIG. 17(a), or by decreasing part of the power to make the recording film amorphous, as shown in FIG. 17(b), by pulsing the power in a series of pulses, by narrowing the width of the amorphous region 1702, or by making the power smaller to cause amorphous narrowing of the amorphous region. It is permissible to adopt the method of changing the writing track number, such as leaving the figure writing track alternately. Here, an example was given regarding the forming of a figure consisting of letters and pictures in the amorphous region, but it may be permissible to form a figure in the crystalline region.

The data recording performs recording without a space sequentially in the address order from the smaller address number, except in the case where a region in which recording cannot be performed due to an error is encountered. However, the figure writing does not write data in the address order, but data is written on the basis of the writing pattern only in the area which needs writing on the basis of the writing coordinates. In this case, in the no-writing region, such as (X1, Y1), (X1, Y2), (X1, Y3), ... in FIG. 14, writing is not performed. Therefore, writing is performed at random addresses.

In the case where the data used to perform figure writing is image data, the input data becomes pattern information which has developed the image on the coordinates as shown in FIG. 14. In addition to taking out the image data from the external input, it is permissible to read out data previously stored in the optical disk apparatus. Subsequent processing, such as conversion of written coordinates onto the disk and writing pattern preparation, is the same as the case in which figure writing is performed based on character data entered from the keyboard.

As the method of rewriting, in the case of writing after overall erasing of the rewriting region before figure writing, although the rewriting time is long, there is no dislocation of letters and pictures written previously and letters and pictures to be newly written, and so it is written beautifully. And, there is no need to record the previously written content in the optical disk of the optical disk apparatus, and the system is inexpensive. In the case where only altered points are rewritten without overall erasure, it is necessary to record the previously written content in the optical disk or the optical disk apparatus, but there is the advantage that the writing time is reduced.

Figure 18:
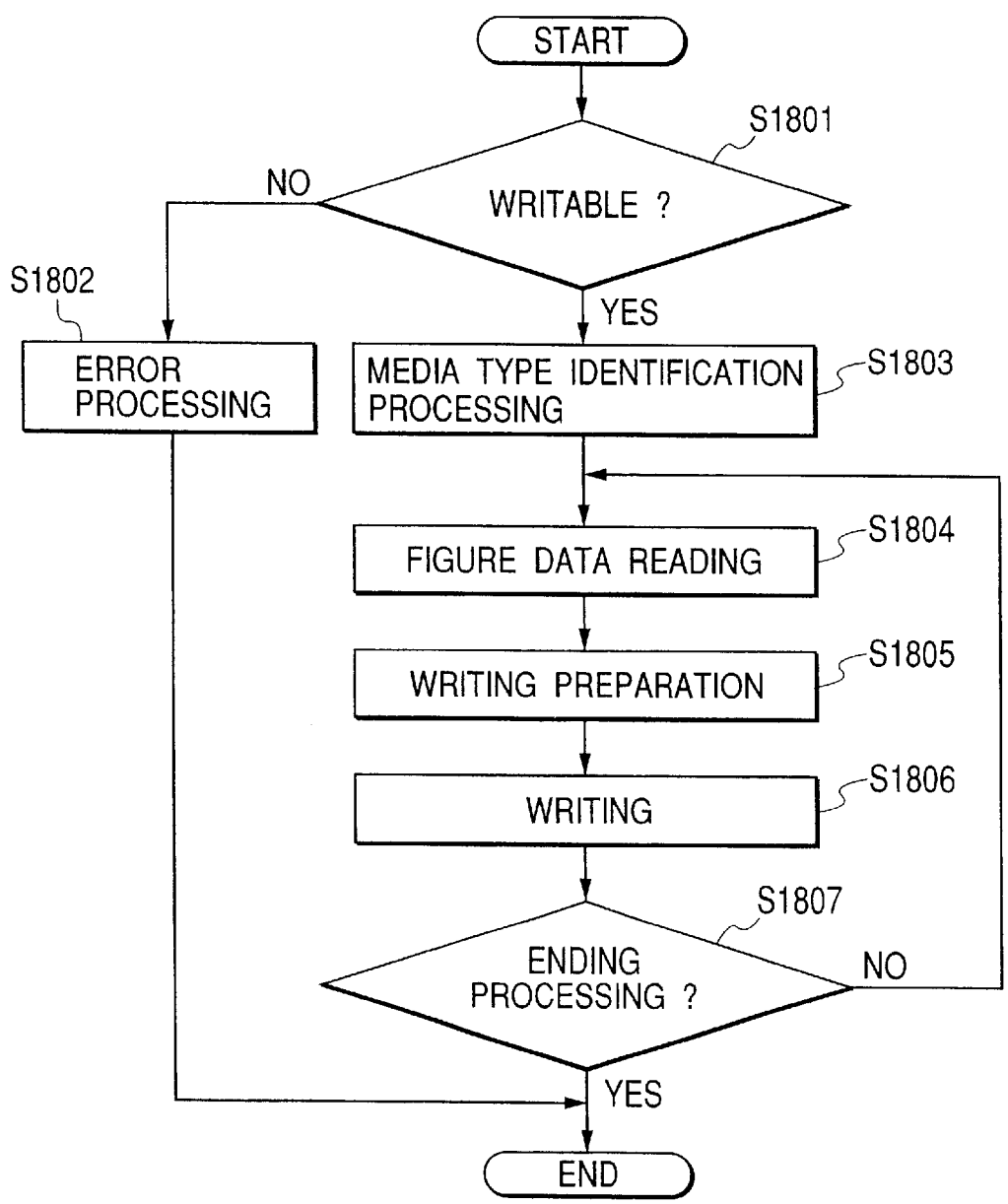
FIG. 18 is a flow chart showing an example of the process of writing figures in the figure writing area of an optical disk.

FIG. 18 is a flow chart showing an example of a process for the case where figures, such as letters and pictures, are written in the figure writing area of the same optical disk using the figure writing data recorded in the data recording area of the optical disk. As the disk is inserted into the apparatus and the power source is enabled, the discrimination process to determine whether or not a figure writable disk is present (step 1801) will be performed first. In the case where a ROM disk or a disk of another standard than that of the apparatus has been inserted, an error process is performed since the disk is not writable (step 1802). If the disk is figure writable, then the discrimination process to determine the kind of disk is performed next (step 1803). In the discrimination step to determine the kind of disk, correspondence between the coordinates for figure writing and the sector arrangement of the optical disk is examined, as was explained with reference to FIG. 11. Then, data for figure writing is read from the data recording area (step 1804). As data is entered, the writing of figure data is performed through the writing preparation (step 1805). After the figure writing process has been completed, the process is repeated by returning from step 1807 to step 1804 if there is additional data, and the process terminates if there is no more data for figure writing. When the content of a visible figure recorded in the figure writing area is contained in the record data of the optical disk, as indicated above, it is possible to effect correspondence between the written content and the record content of the optical disk.

Figure 19A:
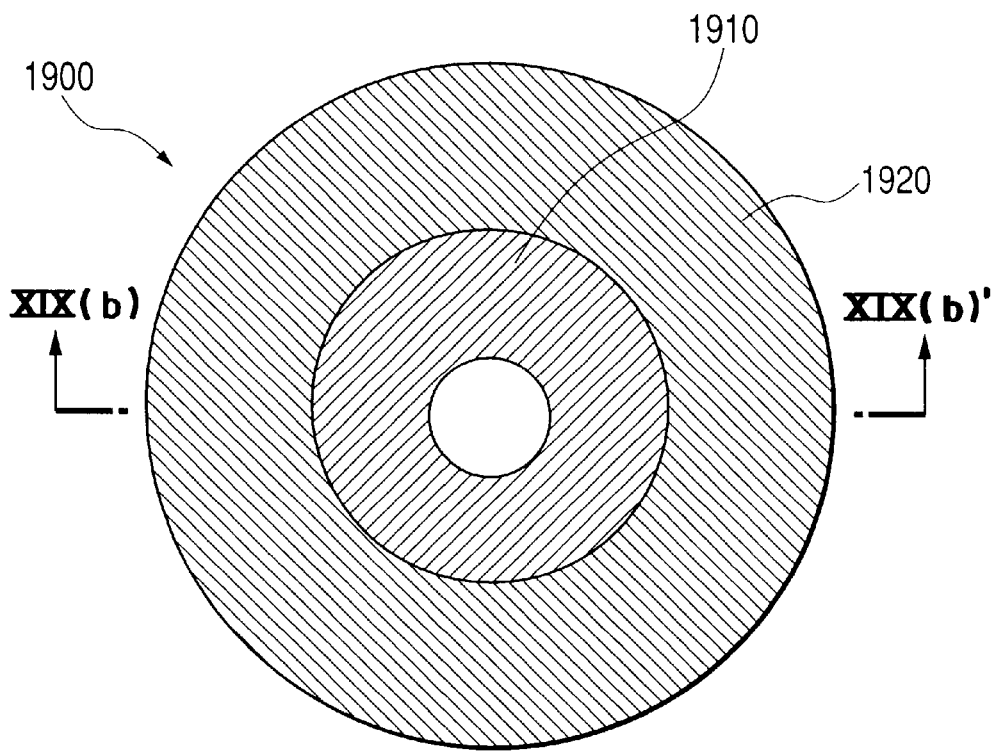
FIG. 19(a) is a diagram of an optical disk having the ROM region and the RAM region.
Figure 19B:
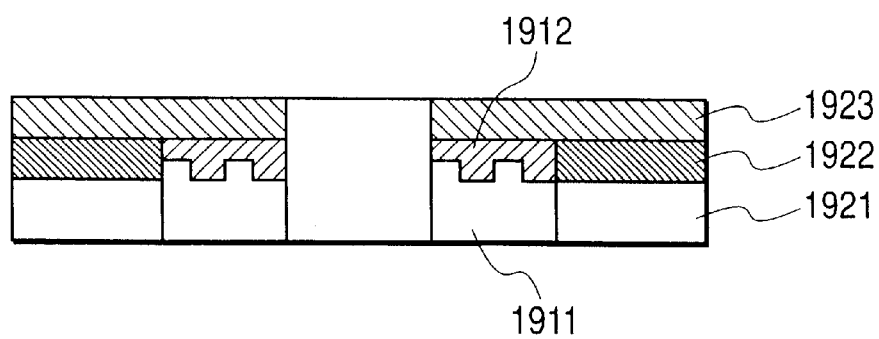
FIG. 19(b) is a cross-section taken along line XIX(b)–XIX(b)' in FIG. 19(a)

It is possible to form the ROM region and RAM region in the optical disk so that data for figure writing is stored in the ROM region, and visible figures, such as pictures and letters, are written in the area for figure writing set in the RAM. FIG. 19(a) is a diagram showing a plan view of a disk having such a ROM region and RAM region, and FIG. 19(b) is a sectional view thereof taken along line XIX(b)–XIX(b)' in FIG. 19(a). This optical disk 1900 has a ROM region 1910 formed inside, in which an application program, such as a game, for example, and data for writing visible figures, such as pictures and letters used in stages during the advance of the game, are stored, and a RAM region 1920 formed outside, in which data is recorded and visible letters and pictures are written. The ROM region 1910 has a ROM reflecting layer 1912 formed on a ROM substrate 1911, and the RAM region 1920 has a RAM recording film 1922 formed on the RAM substrate 1921. A protective layer 1923 is formed on the ROM reflecting layer 1912 and the RAM recording film 1922.

Figure 20A:
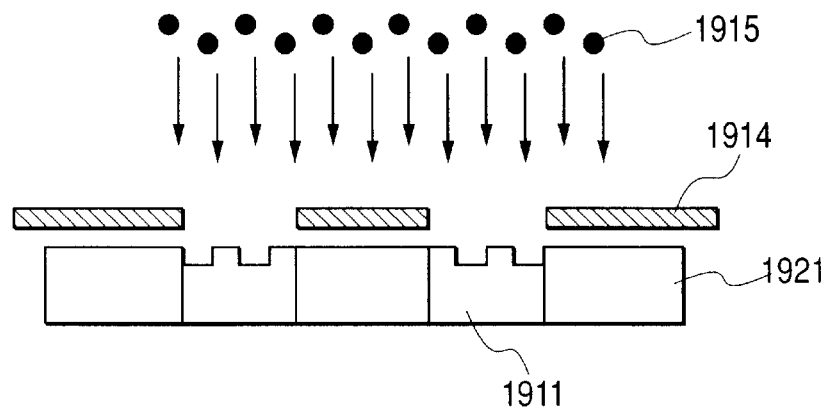
FIGS. 20(a) to 20(c) are process diagrams illustrating the method of production of the optical disk shown in FIG. 19(a)
Figure 20B:
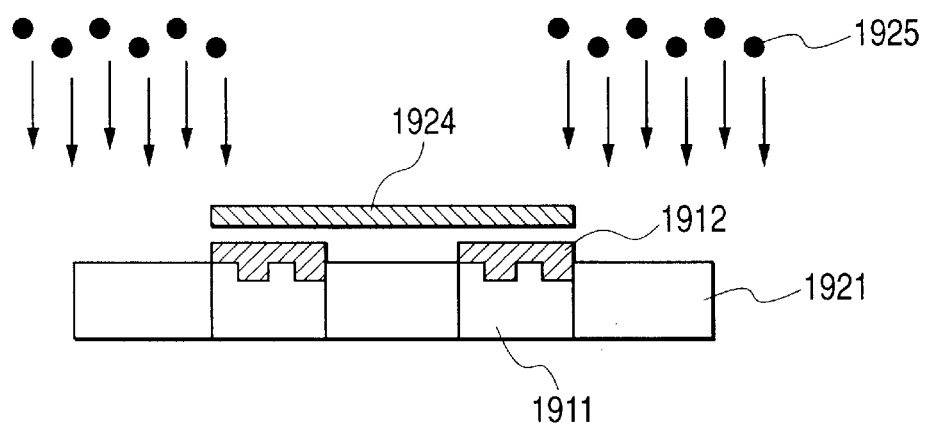
Figure 20C:
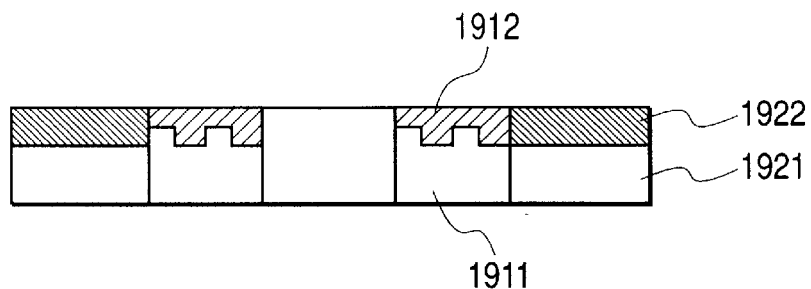

FIGS. 20(a) to 20(c) are process diagrams which illustrate the method of manufacture of the optical disk shown in FIG. 19(a). First, as shown in FIG. 20(a), on a polycarbonate substrate having a diameter of 12 cm and a thickness of 0.6 mm which combines both the RAM substrate 1921 having grooves for tracking on the surface and the ROM substrate 1911 having concave-convex information, a ROM reflecting layer material 1915 is deposited as a film through an outer circumferential and central mask 1914 to form the ROM reflecting layer 1912 as shown in FIG. 20(b). Then, as shown in FIG. 20(b), through an inner circumferential and central mask 1924, RAM recording film material 1925 is deposited, that is, a lower protective layer, a RAM recording film, an upper protective layer, and a reflective layer are sequentially deposited, to form the RAM recording film 1922 as shown in FIG. 20(c). A protective layer is then formed thereon. As a protective layer material, ZnS—SiO$_2$, oxide, nitride, etc., may be used, and as a reflective layer material, Al alloy, Ag alloy, Au alloy, etc., may be used. The formation of the layers may be performed by a magnetron sputtering apparatus. After that, the protective layer 1923 is formed on the ROM reflective layer 1912 and the RAM recording film 1922. After the protective layer 1923 is formed, initialization of the RAM recording film 1922 is performed. Here, the ROM reflective layer 1912 is formed before the RAM recording film 1922, but this order may be reversed.

Now, an example of a case in which the present invention is applied to a game will be explained. In the optical disk, a game program as an application program is recorded and figure writing data for visible pictures and letters is also recorded. This data can be recorded in the ROM region of the optical disk. Also, the optical disk has a RAM region to write figures, such as visible pictures and letters. It is supposed that the game proceeding information showing in which stage the game was finished at the end of the previous game and information showing figures for which a stage was written in the disk plane at the end of the previous game are recorded in the RAM region of the optical disk. As an example, a game called the "Kappa Game" or "Water Imp Game" will be considered.

Figure 7A:
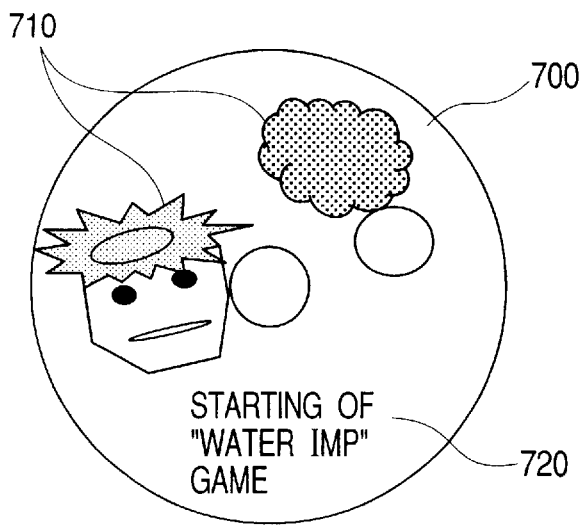
FIGS. 7(a) to 7(c) are diagrams showing an example in which pictures and letters as visible figures are written in the recording film of one layer of the multilayer disk according to the present invention.
Figure 7B:
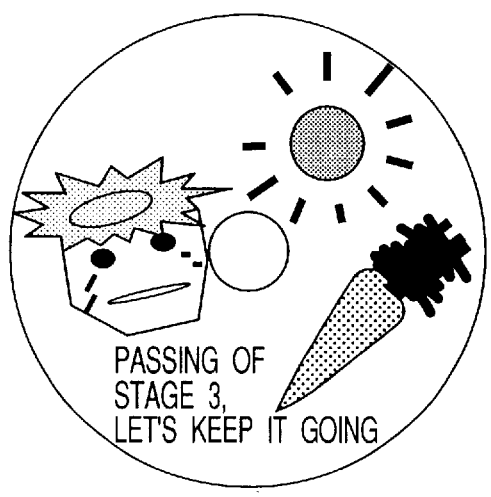
Figure 7C:
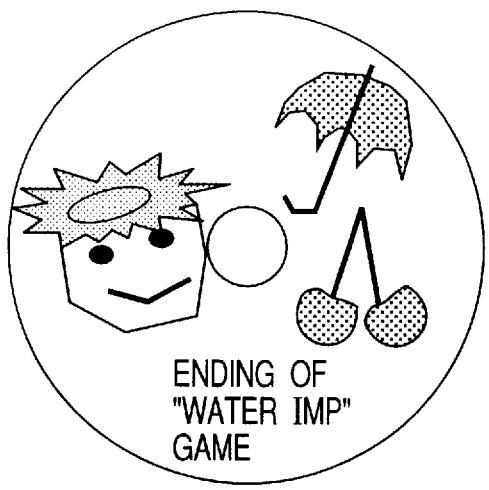

The "Kappa Game" or "Water Imp Game" is a game whose object is to forecast weather from such items as a weather outlook, weather chart, air temperature, infrared photographs from satellites, etc. There are a plurality of stages according to the degree of ease and difficulty of the weather forecast. If the weather forecast comes true, it is possible to proceed to the next stage. At the game start time and until the first stage is cleared, the figure writing of the initial state shown in FIG. 7(a) is performed on the disk plane. Each time the stage is cleared, the information written to the disk plane is altered, and when the third stage is cleared, the visible pictures and letters as shown in FIG. 7(b) are written in the optical disk plane. After the final stage has been finished, the pictures and letters as shown in FIG. 7(c) are to be written.

Figure 21:
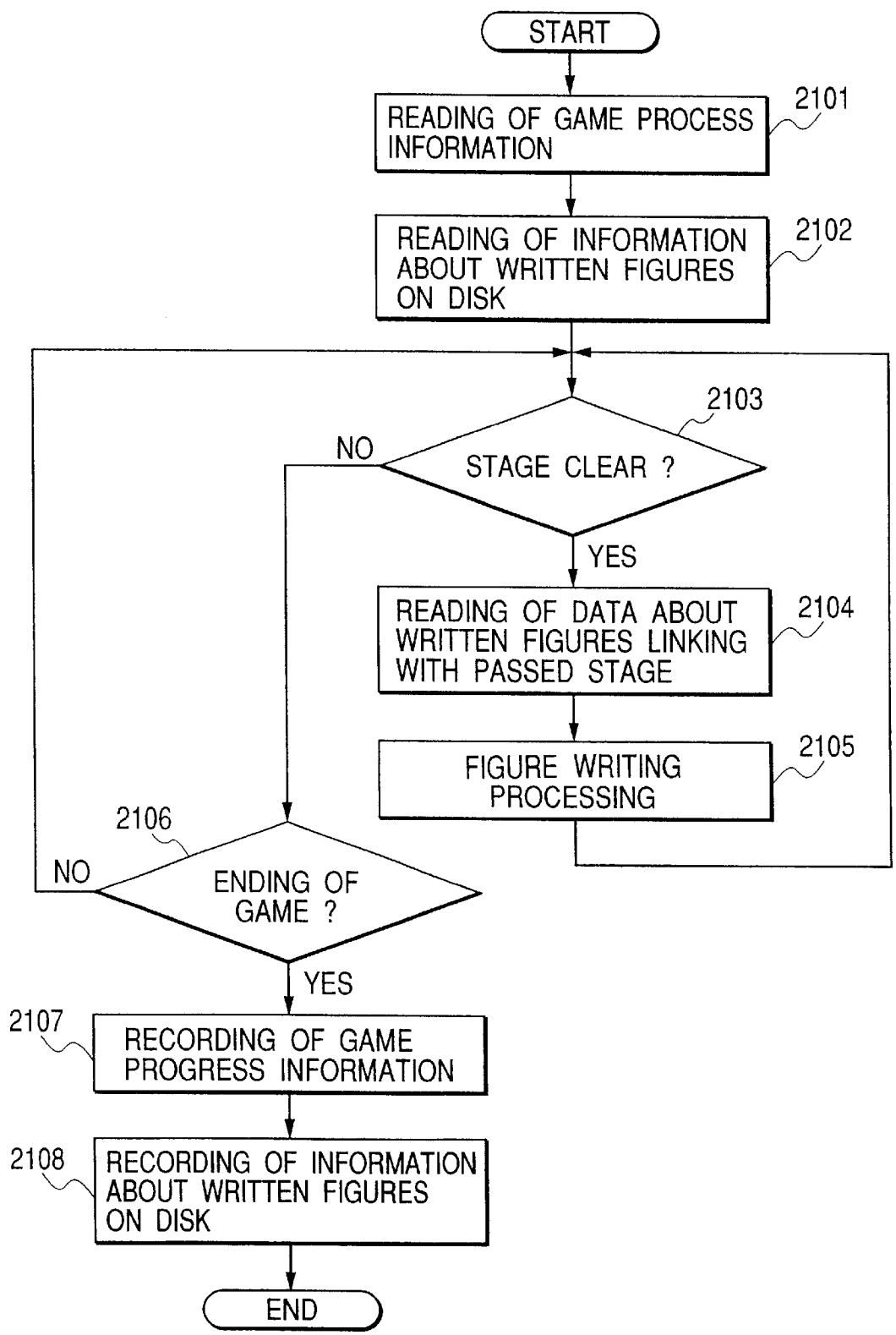
FIG. 21 is a flow chart illustrating the figure writing process applied to the disk plane which is performed as the game proceeds.

FIG. 21 is a flow chart concerning the figure writing process to write data on the disk plane, which is executed with the advance of this game. As the optical disk in which the game program is stored is loaded into the optical disk apparatus and the game starts, the optical disk apparatus reads information concerning the previous game finish recorded in the RAM region in the optical disk, that is, the game advance information showing at what stage the game was completed (step 2101). Also, in the same way, information showing figures for what stage is written in the current disk plane is read out from the RAM region of the optical disk (step 2102). After that, the game proceeds in response to the user's input action according to the game program.

When the stage is cleared and the judgment of the step 2103 becomes Yes, the advance information of the game is transmitted to the system controller, and the figure writing data is read from the ROM region in accordance with the "stage clear information" showing what stage has been cleared (step 2104). The system controller converts the figure writing data which has been read into the waveform for writing and the writing position information, and performs the figure writing process (step 2105). In the case where the judgment of step 2103 is No, it judges whether or not to finish the game (step 2106), and returns to step 2103 in the case of game continuation. Also, in the case where the game is finished, the game progress information is recorded in the RAM region of the optical disk (step 2107). After recording a figure indicating what stage is written in the disk plane (step 2108), it ends. Thus, the pictures and letters visible with the naked eye which appear on the disk plane of the optical disk change as shown in FIGS. 7(a) to 7(c). The users of the game bring their own game disks and can enjoy showing one another how many stages they have cleared.

An example in which the figure writing data is recorded in the same optical disk as that in which the game program was recorded has been considered, but it is not always necessary to store the figure writing data in the optical disk. For example, the figure writing data may be stored in the optical disk apparatus (game machine) or in the application software. In this case, the figure writing data is read from the optical disk apparatus or application software according to the stage clear information and is transmitted to the writing means. Also, it is not always necessary to record in the optical disk the game advance information showing the stage at which the game was finished or the information showing the disk plane in which the figure for the stage is written, since the information may be held in the game machine (optical disk apparatus).

Also, as the figure writing means, the type causing a change in the atomic arrangement of the recording film material by irradiating the recording film with a laser beam as shown in FIG. 2 is preferable, because the precision of the writing position is high. However, causing a change in the atomic arrangement of the recording film material by irradiating the recording film with light, such as from a xenon lamp or a halogen lamp, other than a laser beam, is acceptable. By this method, although the writing position precision is worse compared with the method which uses laser beam irradiation, it is possible to shorten the writing time. Moreover, causing a change in the atomic arrangement by heating with other means than heat is also acceptable.

In the case where the figure writing is performed by laser irradiation, if the spot shape of a laser beam is a circle or close to a circle, and is larger than the minimum value of the recording mark length/width and less than two times of the above-mentioned minimum value, the reproduction of the recorded mark is possible and the figure writing is also possible and therefore preferable. In order to perform the figure writing at a high speed, there is a method which uses a light spot having the shape of an elongated circle or an ellipse which is long in the disk radial direction, but is not suitable for the reproduction of the recorded marks. If it has an optical head having both of the spot shapes which change into a circle or close to a circle at the recording/reproducing time of data and an elongated circle or an ellipse at the figure writing time, the recording/reproducing of data is possible and the figure writing time becomes short and therefore is preferable. Also, two kinds of optical heads may be provided for the recording/reproducing of the recording marks and for figure writing.

As explained above, according to the present invention, it is possible to write visible letters and pictures on an optical disk.

The foregoing invention has been described in terms of preferred embodiments. However, those skilled in the art will recognize that many variations of such embodiments exist. Such variations are intended to be within the scope of the present invention and the appended claims.

What is claimed is:

1. A method of writing a visible figure in an optical disk, comprising the steps of:

providing an application program;

providing an optical disk which has a recording region or a recording film, wherein the recording region or the recording film is made of a phase-changing material, wherein a first visible figure is written in the recording region or the recording film, wherein the application program stores data to write a second visible figure in the optical disk;

reading data for writing the second visible figure while the application program is proceeding;

developing figure data which has been read into coordinates for writing;

converting the coordinates for writing into coordinates on the disk;

generating a laser driving pattern for each track of the recording region or the recording film to write the second visible figure based on the figure data developed on the coordinates on the disk; and driving a laser based on the laser driving pattern, thereby irradiating the optical disk with beam pulses to write the second visible figure in the recording region or the recording film to change the first visible figure into the second visible figure.

2. A method according to claim 1, wherein the step of writing the second visible figure is accomplished by gathering element regions in which an average reflectivity per area of 0.01 mm×0.01 mm differs by more than 5% from a background region at any of visible wavelengths.

3. A method according to claim 1, wherein the second visible figure includes at least one of a letter and a symbol.

4. A method according to claim 1, wherein the application program is stored in the optical disk.

* * * * *